US010585317B2

(12) United States Patent
Xu et al.

(10) Patent No.: US 10,585,317 B2
(45) Date of Patent: Mar. 10, 2020

(54) COA SUBSTRATE AND MANUFACTURING METHOD THEREOF AS WELL AS DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Zhicai Xu, Beijing (CN); Kui Zhang, Beijing (CN); Hui Li, Beijing (CN); Mengqiu Liu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 144 days.

(21) Appl. No.: 15/822,694

(22) Filed: Nov. 27, 2017

(65) Prior Publication Data

US 2018/0284507 A1 Oct. 4, 2018

(30) Foreign Application Priority Data

Mar. 31, 2017 (CN) .......................... 2017 1 0210793

(51) Int. Cl.
*G02F 1/1362* (2006.01)
*G02B 5/20* (2006.01)
*G02F 1/1345* (2006.01)

(52) U.S. Cl.
CPC ........... *G02F 1/1362* (2013.01); *G02B 5/201* (2013.01); *G02F 1/13452* (2013.01);
(Continued)

(58) Field of Classification Search
CPC ............. G02F 1/13452; G02F 1/13458; G02F 2001/136222
See application file for complete search history.

(56) References Cited

U.S. PATENT DOCUMENTS

2011/0090445 A1* 4/2011 Kim ...................... G02F 1/1339 349/139
2014/0021494 A1* 1/2014 Zhao ...................... H01L 33/50 257/88

(Continued)

FOREIGN PATENT DOCUMENTS

CN 202093289 U 12/2011
CN 104319277 A 1/2015

OTHER PUBLICATIONS

Second Office Action for CN Appl. No. 201710210793.3, dated Jun. 26, 2019.

*Primary Examiner* — Alexander P Gross
(74) *Attorney, Agent, or Firm* — Foley & Lardner LLP; James E. Ewing; Paul M. H. Pua

(57) ABSTRACT

The present disclosure relates to a COA substrate and a manufacturing method thereof, a display device. The COA substrate includes the following layers in a wiring region: a first conduction layer including a signal wire lead; an insulation layer having a first via to expose the signal wire lead; a second conduction layer including a first metal pattern with a second via; a flat layer having a hollowed-out region; and a connection pattern. The second via is at least in part located within the hollowed-out region, and orthographic projections of a border of a portion of the second via which is located within the hollowed-out region and a border of the first via on the base substrate overlap. The connection pattern extends through the first via and the second via and connects to the signal wire lead.

18 Claims, 9 Drawing Sheets

(52) U.S. Cl.
CPC .... *G02F 1/13458* (2013.01); *G02F 1/136286* (2013.01); *G02F 2001/136222* (2013.01)

(56) References Cited

U.S. PATENT DOCUMENTS

| | | | | |
|---|---|---|---|---|
| 2014/0319530 | A1* | 10/2014 | Chung | G02F 1/134363 257/72 |
| 2016/0231631 | A1* | 8/2016 | Fu | G02F 1/1345 |
| 2019/0033636 | A1* | 1/2019 | Morinaga | G02F 1/1339 |

* cited by examiner

COA SUBSTRATE AND MANUFACTURING METHOD THEREOF AS WELL AS DISPLAY DEVICE

CROSS-REFERENCE TO RELATED APPLICATIONS

The present application claims priority to Chinese Patent Application No. 201710210793.3 filed on Mar. 31, 2017, the disclosure of which is incorporated by reference herein in its entirety.

TECHNICAL FIELD

The present disclosure relates to a COA substrate and a manufacturing method thereof as well as a display device.

BACKGROUND

A Color Filter on Array (COA) substrate is formed by directly manufacturing a color film layer on an array substrate. Since there is not a problem of aligning a color film substrate with the array substrate in a display panel which adopts the COA substrate, it is possible to reduce the box-alignment difficulty in a process of manufacturing the display panel and avoid the error upon box-alignment. Therefore, the black matrix may be designed to be narrower, thereby improving the aperture ratio of a pixel.

SUMMARY

According to some embodiments of the present disclosure, there is provided a Color Filter on Array (COA) substrate, including a display region and a wiring region, the COA substrate including the following layers: a first conduction layer on the base substrate, including a signal wire lead located in the wiring region; an insulation layer, its portion located in the wiring region having a first via to expose the signal wire lead; a second conduction layer, including a first metal pattern which is located in the wiring region and a second metal pattern which is located in the display region, wherein the first metal pattern has a second via; a flat layer, its portion located in the wiring region having a hollowed-out region; and a connection pattern, located in the wiring region, wherein the second via is at least in part located within the hollowed-out region, and an orthographic projection of a border of a portion of the second via which is located within the hollowed-out region on the base substrate at least in part overlaps an orthographic projection of a border of the first via on the base substrate, and the connection pattern extends through the hollowed-out region, the first via and the second via and connects to the signal wire lead.

According to some embodiments of the present disclosure, there is provided a display device which includes the above mentioned COA substrate.

According to some embodiments of the present disclosure, there is provided a manufacturing method of a COA display substrate, including: forming a first conduction layer on the base substrate, the first conduction layer including a signal wire lead located in a wiring region; forming a first insulation thin film; forming a second conduction layer, the second conduction layer including a first metal pattern which is located in the wiring region and a second metal pattern which is located in the display region; wherein the first metal pattern is formed with a second via, the second via is at least in part formed on the signal wire lead; forming a flat layer, a portion of the flat layer which is located in the wiring region being formed with a hollowed-out region; the second via being at least in part located within the hollowed-out region; etching a portion exposing a first insulation thin film to form an insulation layer, a position of the insulation layer which faces a portion of the second via located in the hollowed-out region being formed with a first via; forming a connection pattern in the wiring region, the connection pattern extending through the hollowed-out region, the first via and the second via and electrically connecting to the signal wire lead.

BRIEF DESCRIPTION OF THE DRAWINGS

In order to explain some embodiments of the present disclosure or technical solutions in the technology known by the present inventor more clearly, drawings which are needed to be used in the description of the embodiments or the technology known by the present inventor will be introduced briefly below. Obviously, the drawings in the following description are only some embodiments of the present disclosure. Those ordinary skilled in the art may further obtain other drawings according to these drawings, without creative labor.

FIG. 2(*b*) is a sectional view in a CC' direction in FIG. 2(*a*);

FIG. 4(*b*) is a sectional view in an AA of the present disclosure;

FIG. 5(*b*) is a sectional view in a BB of the present disclosure;

FIG. 6(*b*) is a fourth structural diagram of a COA substrate provided according to some embodiments of the present disclosure;

FIG. 6(*c*) is a fifth structural diagram of a COA substrate provided according to some embodiments of the present disclosure;

DETAILED DESCRIPTION

Hereinafter, a clear and complete description of technical solutions in some embodiments of the present disclosure will be given in conjunction with drawings in some embodiments of the present disclosure. Obviously, described embodiments are only a part of embodiments of the present disclosure, but not all of them. Based on embodiments in the present disclosure, all other embodiments obtained by those skilled in the art without creative labor fall within the protection scope of the present disclosure.

Figure 1:
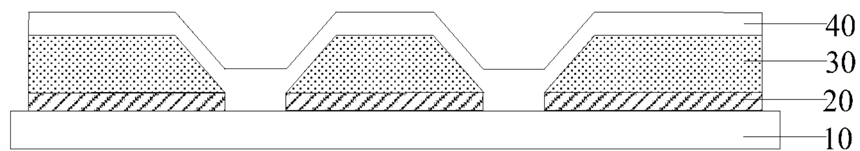
FIG. 1 is a first structural diagram of an exemplary COA substrate provided by the technology known by the present inventor.

In a COA substrate, since a color film layer is directly manufactured on an array substrate, a large mismatch of a surface of the array substrate is caused, which may affect the manufacturing of subsequent processes. In the technology known by the present inventor, the mismatch is eliminated by adding a flat layer, wherein the flat layer is for example an organic film layer (Organic, abbreviated as ORG). However, the COA substrate also needs to provide a connection pattern (including a PIN pattern, also called a pin pattern) which is electrically connected with a signal wire lead (for example: a gate wire lead, a data wire lead, etc). The connection pattern is usually located on an uppermost layer of the COA substrate so as to be bound to an externally connected chip provided on the COA substrate (for example, by way of press fit, etc), so that the externally connected chip and the signal wire lead are electrically connected. When the flat layer is added, since the flat layer is relatively thick (generally 10000~30000 Å), as shown in FIG. 1, a bad contact of a connection pattern 40 with a signal wire lead 10 is caused when the connection pattern 40 formed on a flat layer 30 is connected with the signal wire lead 10 through a via in a flat layer 30 and an insulation layer 20. In order to solve this problem, a part of the flat layer 30 of a wiring region (a Pad region) is generally removed.

Figure 2A:
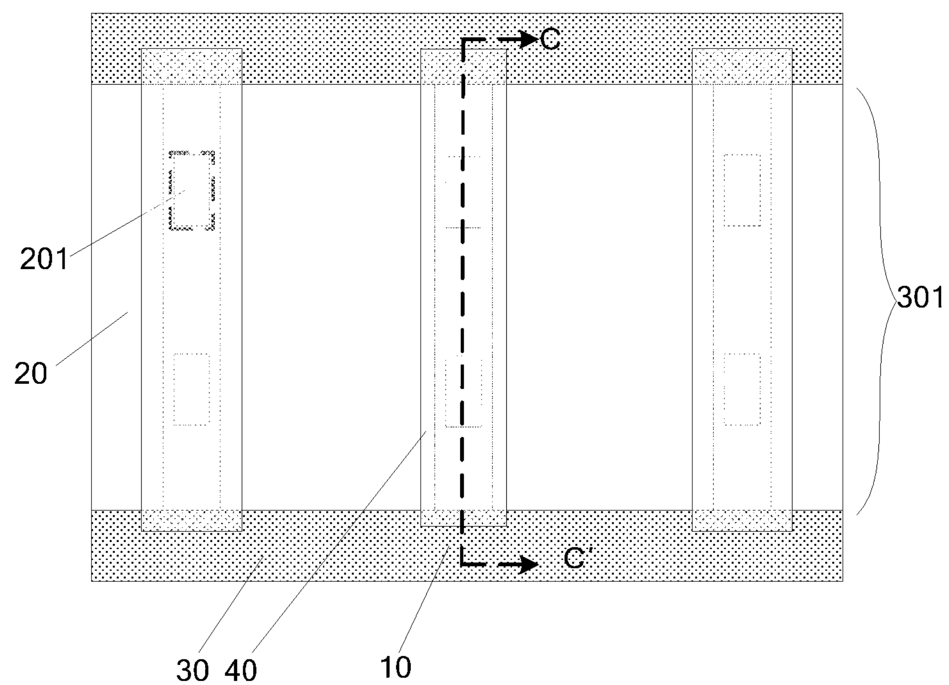
FIG. 2(*a*) is a second structural diagram of an exemplary COA substrate provided by the technology known by the present inventor.
Figure 2B:
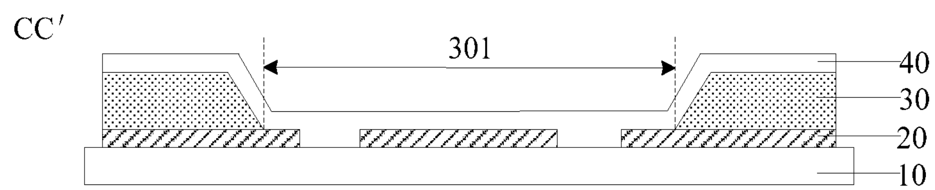

In the technology known by the present inventor, as shown in FIGS. 2(*a*) and 2(*b*), a first mask is used to form a hollowed-out region 301 in the flat layer 30 of the wiring region, a second mask is used to form a via 201 in a portion of the insulation layer 20 which is located in the wiring region, a third mask is used to form the metal pattern in a display region, wherein an orthographic projection of the border of the via 201 on a base substrate is within an orthographic projection of the border of the hollowed-out region 301 on the base substrate, the connection pattern 40 extends through the hollowed-out region 301 and the via 201 in the insulation layer 20 and connects to the signal wire lead 10 of the wiring region. However, although a good contact of the connection pattern 40 with the signal wire lead 10 may be achieved in this way, since the insulation layer 20 is not patterned in the technology known by the present inventor, if the via 201 is to be formed in the portion of the insulation layer 20 which is located in the wiring region, it is necessary to add an additional second mask, thus resulting in an increase in the cost.

Figure 3:
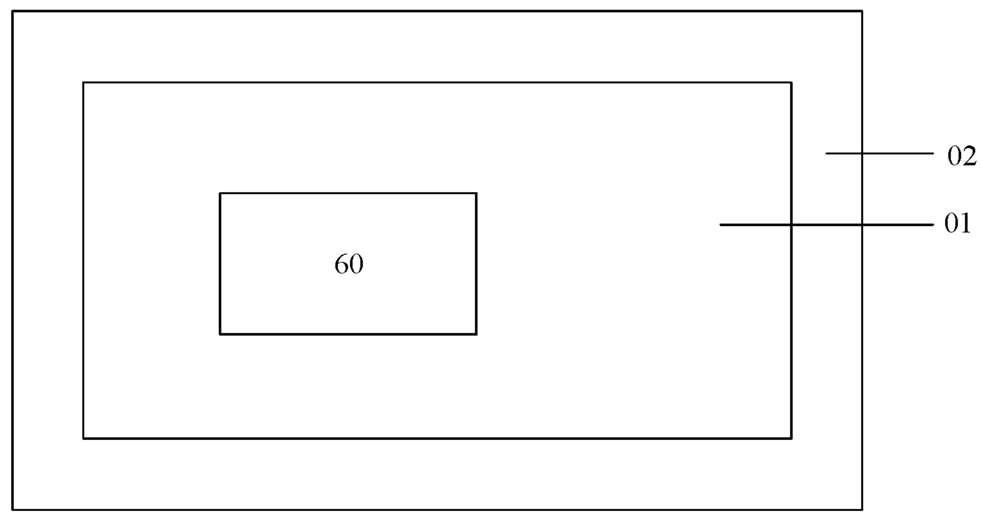
FIG. 3 is a structural diagram of a case where a COA substrate provided according to some embodiments of the present disclosure is divided into a display region and a wiring region.
Figure 4A:
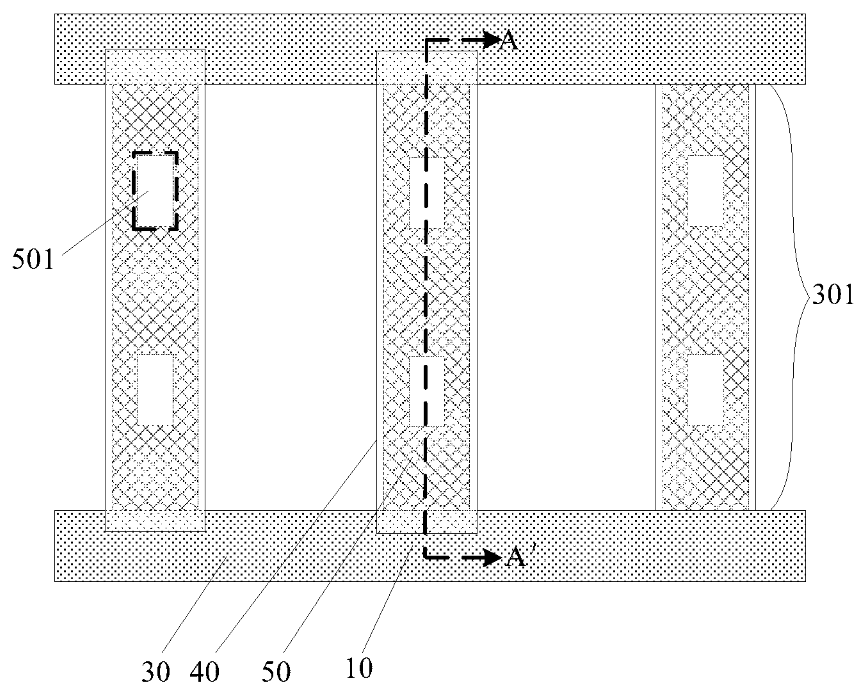
FIG. 4(*a*) is a first structural diagram of a COA substrate provided according to some embodiments of the present disclosure.
Figure 4:
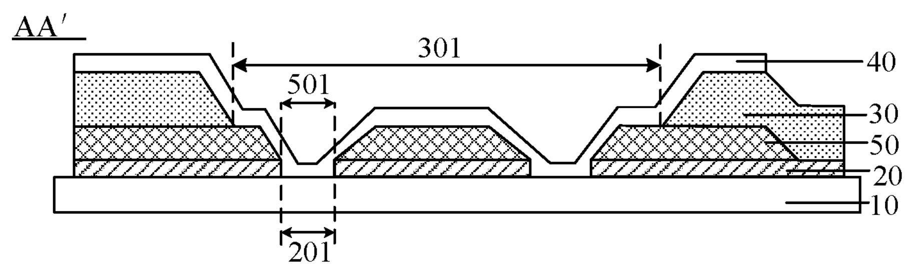

According to some embodiments of the present disclosure, there is provided a COA substrate. In some embodiments, as shown in FIG. 3, the COA substrate includes a display region 01 and a wiring region 02. As shown in FIGS. 4(*a*)-6(*c*), the COA substrate includes a first conduction layer, an insulation layer 20, a second conduction layer, a flat layer 30 as well as a connection pattern 40, which are provided on the base substrate.

In some embodiments, the first conduction layer includes a signal wire lead 10 located in the wiring region 02. A portion of the insulation layer 20 which is located in the wiring region 02 has a first via 201 to expose the signal wire lead 10. The second conduction layer includes a first metal pattern 50 which is located in the wiring region 02 and a second metal pattern 60 which is located in the display region 01 (as shown in FIG. 3), the first metal pattern 50 has a second via 501. A portion of the flat layer 30 which is located in the wiring region 02 has a hollowed-out region 301, the second via 501 is at least in part located within the hollowed-out region 301, and an orthographic projection of the border of a portion of the second via 501 which is located within the hollowed-out region 301 on a base substrate overlaps an orthographic projection of the border of the first via 201 on the base substrate. The connection pattern 40 is located in the wiring region 02, the connection pattern 40 extends through the hollowed-out region 301, the first via 201 and the second via 501 and connects to the signal wire lead 10.

The present disclosure does not limit the specific structure of the display region 01, any display structure existing in the art is applicable to technical solutions provided according to some embodiments of the present disclosure.

In the present disclosure, the wiring region 02 may also be called a non-display region, which refers to a region in the COA substrate which is located on the periphery of the display region 01. The wiring region 02 may be used to provide a drive chip, a signal wire lead, etc.

In some embodiments, the first conduction layer may only include a signal wire lead 10. In some embodiments, in addition to the signal wire lead 10, the first conduction layer may include other patterns, e.g. a signal wire which is located in the display region. In some embodiments, the material of the first conduction layer is, for example, but not limited to, metal or metal oxide, etc.

Figure 5:
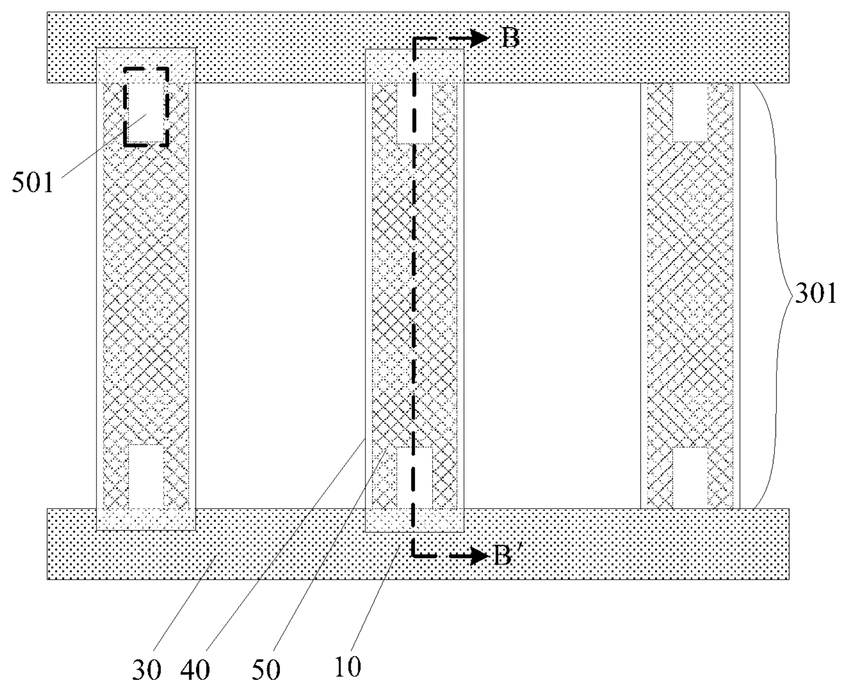
FIG. 5(*a*) is a second structural diagram of a COA substrate provided according to some embodiments of the present disclosure.
Figure 5:
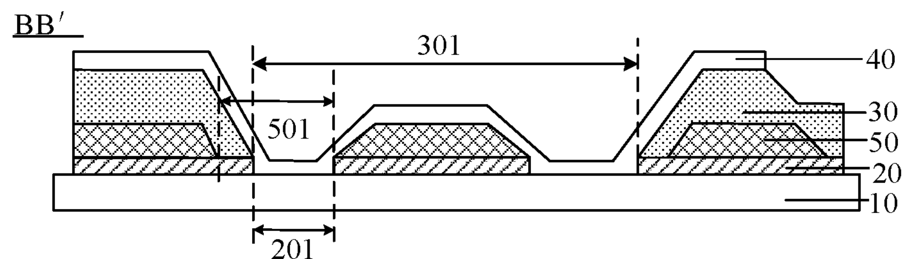

As described above, the second via 501 is at least in part located within the hollowed-out region 301. In some embodiments, for example, as shown in FIGS. 4(*a*) and 4(*b*), the second via 501 is entirely located within the hollowed-out region 301, that is, the orthographic projection of the border of the second via 501 on the base substrate is within the orthographic projection of the border of the hollowed-out region 301 on the base substrate. In some other embodiments, for example, as shown in FIGS. 5(*a*) and 5(*b*), the orthographic projection of the second via 501 on the base substrate has an overlapping region with the orthographic projection of the flat layer 30 on the base substrate, and has an overlapping region with the orthographic projection of the hollowed-out region 301 on the base substrate.

In some embodiments, the first metal pattern 50 and the second metal pattern 60 are located in a same layer, thus the first metal pattern may be formed while the second metal pattern is formed. Since the second metal pattern 60 of the display region is a pattern which the COA substrate itself has, it is only necessary to form a pattern corresponding to the first metal pattern 50 in a portion of a mask for forming the second metal pattern 60 which is corresponding to the wiring region, and in this way, it is possible to use the mask to form the first metal pattern 50 and the second metal pattern 60 at the same time. Since no additional mask is needed to form the first metal pattern 50, forming the first metal pattern 50 will not result in an increase in the cost.

In some embodiments of the present disclosure, the second metal pattern 60 may be a source-drain (SD) or a gate (Gate), etc.

In some embodiments of the present disclosure, the portion of the insulation layer 20 which is located in the wiring region 02 has a first via 201, the first metal pattern 50 has the second via 501, the orthographic projection of the border of the portion of the second via 501 which is located within the hollowed-out region 301 on the base substrate at least in part overlaps the orthographic projection of the border of the first via 201 on the base substrate. For example, the first via 201 may expose the signal wire lead 10, the second via 501 may also expose the signal wire lead 10, the first metal pattern 50 and the signal wire lead 10 has an overlapping region in a direction perpendicular to the base substrate.

Figure 6:
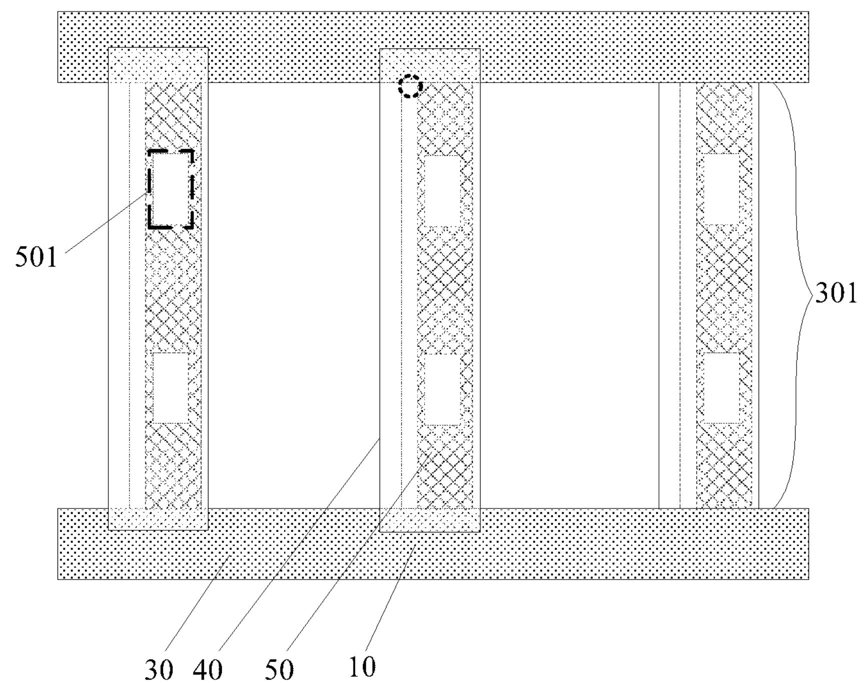
FIG. 6(*a*) is a third structural diagram of a COA substrate provided according to some embodiments of the present disclosure.
Figure 6:
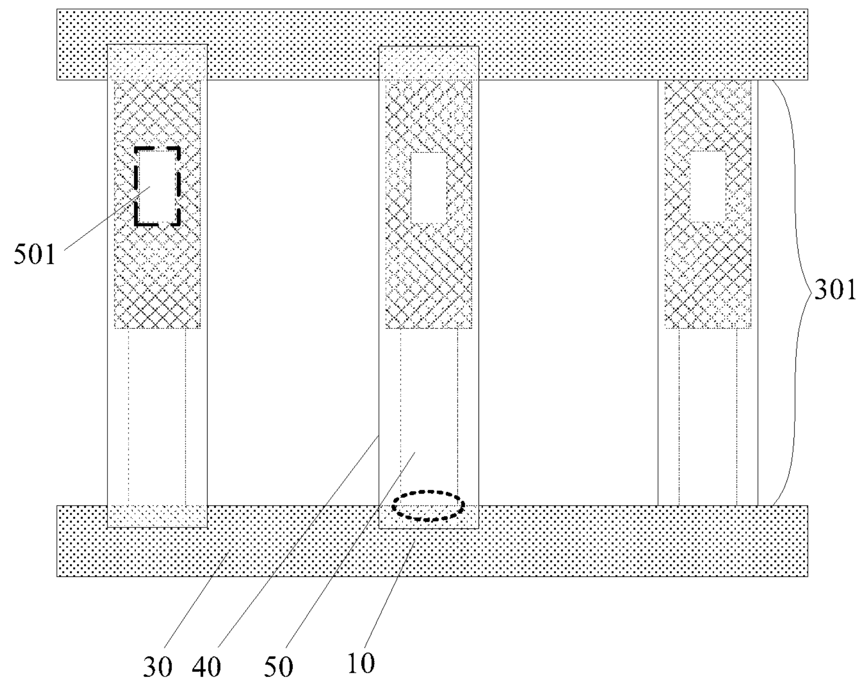
Figure 6:
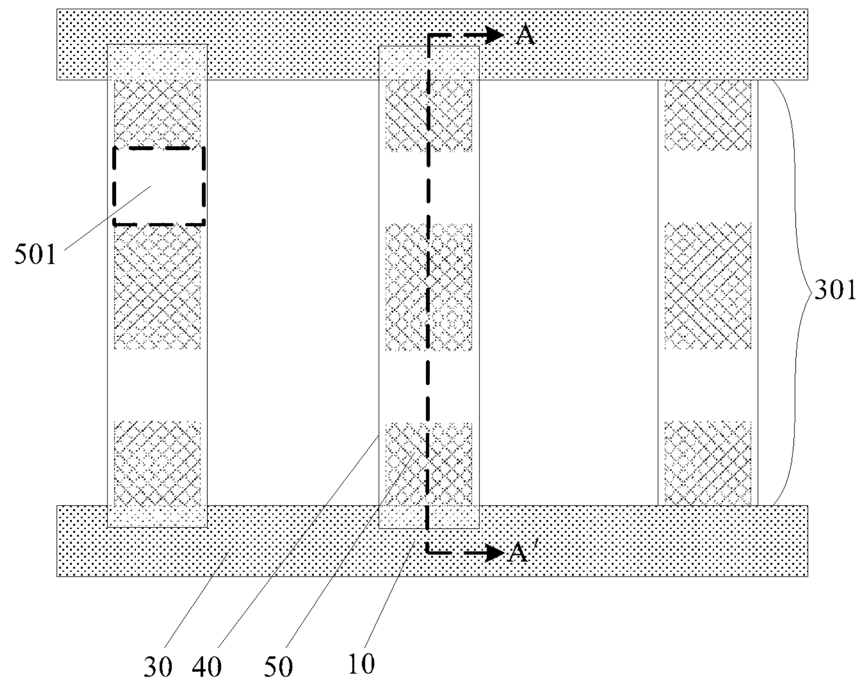

In some embodiments according to the present disclosure, in the direction perpendicular to the base substrate, the first metal pattern 50 and the flat layer 30 may have an overlapping region, also may not have an overlapping region. In some embodiments, the first metal pattern 50 and the flat layer 30 have an overlapping region. For example, as shown in FIGS. 5(*a*) and 6(*c*), the orthographic projection of the first metal pattern 50 on the base substrate covers the orthographic projection of a portion of the signal wire lead 10 corresponding to the hollowed-out region on the base substrate, and two ends of the first metal pattern 50 extend in the extension direction of the signal wire lead 10 to have an overlapping region with the flat layer 30. For example, as shown in FIG. 6(*a*), the orthographic projection of the first metal pattern 50 on the base substrate and the orthographic projection of the portion of the signal wire lead 10 corresponding to the hollowed-out region on the base substrate overlap in part, and two ends of the first metal pattern 50 extend in the extension direction of the signal wire lead 10 to have an overlapping region with the flat layer 30. For example, as shown in FIG. 6(*b*), the orthographic projection of the first metal pattern 50 on the base substrate and the orthographic projection of the portion of the signal wire lead 10 corresponding to the hollowed-out region on the base substrate overlap in part, and one end of the first metal pattern 50 extends in the extension direction of the signal wire lead 10 to have an overlapping region with the flat layer 30.

In some embodiments according to the present disclosure, the size of the second via 501 in the first metal pattern 50 is not limited. For example, the second via 501 may extend, as shown in FIGS. 4(*a*), 5(*a*), 6(*a*) and 6(*b*), in a width direction of the signal wire lead 10, the second via 501 does not penetrate the first metal pattern 50. For example, it is also possible that, as shown in FIG. 6(*c*), in the width direction of the signal wire lead 10, the second via 501 penetrates the first metal pattern 50.

In some embodiments according to the present disclosure, the connection pattern 40 is not limited, as long as the signal wire lead 10 can be connected with the externally connected chip. As an example, the material of the connection pattern 40 may include indium tin oxide (ITO) or indium zinc oxide (IZO) or indium gallium zinc oxide (IGZO) etc, but not be limited thereto.

In some embodiments according to the present disclosure, with reference to FIGS. 4(*a*), 5(*a*) and FIGS. 6(*a*)-6(*c*), since a portion of the insulation layer 20 which faces the hollowed-out region 301 of the flat layer 30 and a portion of the first metal pattern 50 which faces the hollowed-out region 301 of the flat layer 30 overlap entirely in a direction perpendicular to the base substrate, the insulation layer 20 is not shown in FIGS. 4(*a*), 5(*a*) and FIGS. 6(*a*)-6(*c*).

In some embodiments according to the present disclosure, the material of the insulation layer 20 may include for example silicon nitride ($SiN_x$), silicon oxide ($SiO_x$) or silicon oxynitride ($SiO_xN_y$) etc, but not be limited thereto.

In some embodiments of the present disclosure, the base substrate may be for example a glass substrate, may also be a plastic substrate, a metal substrate or other arbitrary usable substrate in the art.

According to the COA substrate provided by some embodiments of the present disclosure, since the second via 501 is formed in the first metal pattern 50 and the second via 501 is at least in part located within the hollowed-out region 301, after the hollowed-out region 301 of the flat layer 30 is formed, it is possible to etch a portion within the hollowed-out region 301 which exposes the insulation thin film without a mask, to form the insulation layer 20 having the first via 201. Thus, the connection pattern 40 may extend though the hollowed-out region 301, the first via 201 and the second via 501 to connect to the signal wire lead 10.

In some embodiments, since the first metal pattern 50 of the wiring region 02 and the second metal pattern 60 of the display region are in the same layer, the first metal pattern 50 may be formed while the second metal pattern 60 is formed, thus no additional mask will be added so that the cost will not be increased.

In some embodiments, as shown in FIGS. 4(*a*), 4(*b*) and FIGS. 6(*a*)-6(*c*), in the direction perpendicular to the base substrate, the first metal pattern 50 and the flat layer 30 have an overlapping region; the orthographic projection of the border of the second via 501 on the base substrate is enclosed by the orthographic projection of the border of the hollowed-out region 301 on the base substrate.

When the orthographic projection of the border of the second via 501 on the base substrate is enclosed by the orthographic projection of the border of the hollowed-out region 301 on the base substrate, the projections of the first via 201 and the second via 501 on the base substrate overlap at this time.

In some embodiments, in the direction perpendicular to the base substrate, the border of the first metal pattern 50 and the border of the flat layer 30 overlap, namely the first metal pattern 50 and the flat layer 30 have an overlapping region.

In some embodiments of the present disclosure, since in the direction perpendicular to the base substrate, the first metal pattern 50 and the flat layer 30 have the overlapping region and the orthographic projections of the borders of the second via 501 in the first metal pattern 50 and the first via 201 in the insulation layer 20 on the base substrate are enclosed by the orthographic projection of the border of the hollowed-out region 301 on the base substrate, when the connection pattern 40 formed on the flat layer 30 connects to the signal wire lead 10, since the insulation layer 20 and the first metal pattern 50 are retained at the section position of the flat layer 30, it is possible to reduce the mismatch at the section position of the flat layer 30, prevent the signal wire lead 10 from being etched due to appearance of a gap at the section position.

In some embodiments, as shown in FIGS. 4(*a*) and 6(*c*), the orthographic projection of the first metal pattern 50 on the base substrate covers the orthographic projection of the portion of the signal wire lead 10 corresponding to the hollowed-out region 301 on the base substrate, and the two ends of the first metal pattern 50 extend in the extension direction of the signal wire lead 10 to have an overlapping region with the flat layer 30.

The orthographic projection of the first metal pattern 50 on the base substrate covers the orthographic projection of the portion of the signal wire lead 10 corresponding to the hollowed-out region 301 on the base substrate. Those skilled in the art should understand that, here, a portion of the first metal pattern 50 other than the second via 501 covers the orthographic projection of the portion of the signal wire lead 10 corresponding to the hollowed-out region 301 on the base substrate. On this basis, the size of the second via 501 is not limited.

In some embodiments of the present disclosure, if the orthographic projection of the first metal pattern 50 on the base substrate and the orthographic projection of the portion of the signal wire lead 10 corresponding to the hollowed-out region on the base substrate overlap in part and/or one end of the first metal pattern 50 extends in the extension direction of the signal wire lead 10 to have an overlapping region with the flat layer 30, a portion of the signal wire lead 10 which does not overlap the first metal pattern 50 (as shown by dotted line circles in FIGS. 6(*a*) and 6(*b*)) may be etched due to the existence of the large mismatch at the section of the flat layer 30. On this basis, the orthographic projection of the first metal pattern 50 on the base substrate covers the orthographic projection of the portion of the signal wire lead 10 corresponding to the hollowed-out region 301 on the base substrate, and the two ends of the first metal pattern 50 extend in the extension direction of the signal wire lead 10 to have the overlapping region with the flat layer 30, so that the whole signal wire lead 10 can be protected.

In some embodiments of the present disclosure, the material of the flat layer 30 is not particularly limited, for example, it may be an organic film layer ORG commonly used in the COA substrate, may also be other commonly used flat layer materials, e.g. silicon nitride, silicon dioxide, silicon oxynitride, aluminum oxide, zirconium dioxide or titanium dioxide.

In some embodiments of the present disclosure, the material of the flat layer 30 is the same as that of the insulation layer 20. With such a structure, during the course of manufacturing the COA substrate, since the first metal pattern 50 has the second via 501, the insulation thin film may be exposed through the second via 501. Meanwhile, the material of the flat layer 30 is the same as that of the insulation layer 20, thereby it is possible to etch and form the hollowed-out region 301 of the flat layer 30 and the first via 201 in the insulation layer 20, so that the manufacturing process of the COA substrate is simplified.

In some embodiments, the signal wire lead 10 is a data wire lead or a gate wire lead.

The data wire lead connects with the data wire in the COA substrate to transmit a signal which drives the output of an Integrated Circuit (IC) to the data wire via the data wire lead; the gate wire lead connects with the gate wire in the COA substrate to transmit a signal which drives the output of the IC to the gate wire via the gate wire lead.

Here, when the signal wire lead 10 is the data wire lead, the data wire lead may be formed simultaneously with the data wire, may also be formed simultaneously with the gate wire. Likewise, when the signal wire lead 10 is the gate wire lead, the gate wire lead may be formed simultaneously with the gate wire, may also be formed simultaneously with the data wire.

In some embodiments, the COA substrate further includes a thin-film transistor which is located in the display region 01. The thin-film transistor includes a source, a drain, an active layer, a gate as well as a gate insulation pattern. For example, the second metal pattern 60 is the source and the drain; or, for example, the second metal pattern 60 is the gate.

The type of the thin-film transistor is not limited, for example, it may be a N type thin-film transistor, may also be a P type thin-film transistor.

In some embodiments of the present disclosure, when the second metal pattern 60 is the source or the drain, the first metal pattern 50 may be formed while the source and the drain (SD layer) are formed. When the second metal pattern 60 is the gate (Gate), the first metal pattern 50 may be formed while the gate is formed. Thus, when forming the first metal pattern 50, it is only necessary to form a pattern corresponding to the first metal pattern 50 in a portion of the mask for forming the second metal pattern 60 which corresponds to the wiring region 02, no additional mask is needed, thereby avoiding the increase in the cost of manufacturing the COA substrate.

In some embodiments, the insulation layer 20 includes a gate insulation pattern which is located in the display region 01.

According to some embodiments of the present disclosure, an insulation layer 20 may be formed, wherein a portion of the insulation layer 20 which is located in the display region 01 may be used as the gate insulation pattern, the portion of the insulation layer 20 which is located in the wiring region 02 is formed with the first via 201, so that the manufacturing process of the COA substrate may be simplified.

According to some embodiments of the present disclosure, there is provided a display device which includes the aforementioned COA substrate.

For example, the display device may be any device which displays an image, whether it is a moving image (e.g., a video) or a fixed image (e.g., a still image), whether it is a character or a picture. More specifically, it is expected that the embodiments may be implemented in various electronic devices or associated with various electronic devices, the various electronic devices are for example (but not limited to) a mobile phone, a wireless device, a personal data assistant (PDA), a handheld or portable computer, a GPS receiver/navigator, a camera, an MP4 video player, a camcorder, a game console, a wristwatch, a clock, a counter, a television monitor, a tablet display, a computer monitor, an automobile display (e.g., an odometer display), a navigator, a cabin controller and/or display, a display of a camera view (e.g., a display of a rear view camera in a vehicle), an electronic photo, an electron billboard or an indication board, a projector, an architectural structure, a package and an esthetic structure (e.g., a display for an image of a piece of jewelry). The display device may also be a display panel.

According to some embodiments of the present disclosure, there is provided a display device. Since the second via 501 is formed in the first metal pattern 50 and the second via 501 is at least in part located within the hollowed-out region 301, after the hollowed-out region 301 of the flat layer 30 is formed, it is possible to etch the portion which exposes the insulation thin film without a mask, to form the insulation layer 20 having the first via 201. Thus, the connection pattern 40 may extend though the hollowed-out region 301, the first via 201 and the second via 501 to connect to the signal wire lead 10. In addition, since the first metal pattern 50 of the wiring region 02 and the second metal pattern 60 of the display region are in the same layer, the first metal pattern 50 may be formed while the second metal pattern 60 is formed, thus no additional mask will be added so that the cost will not be increased.

Figure 7:
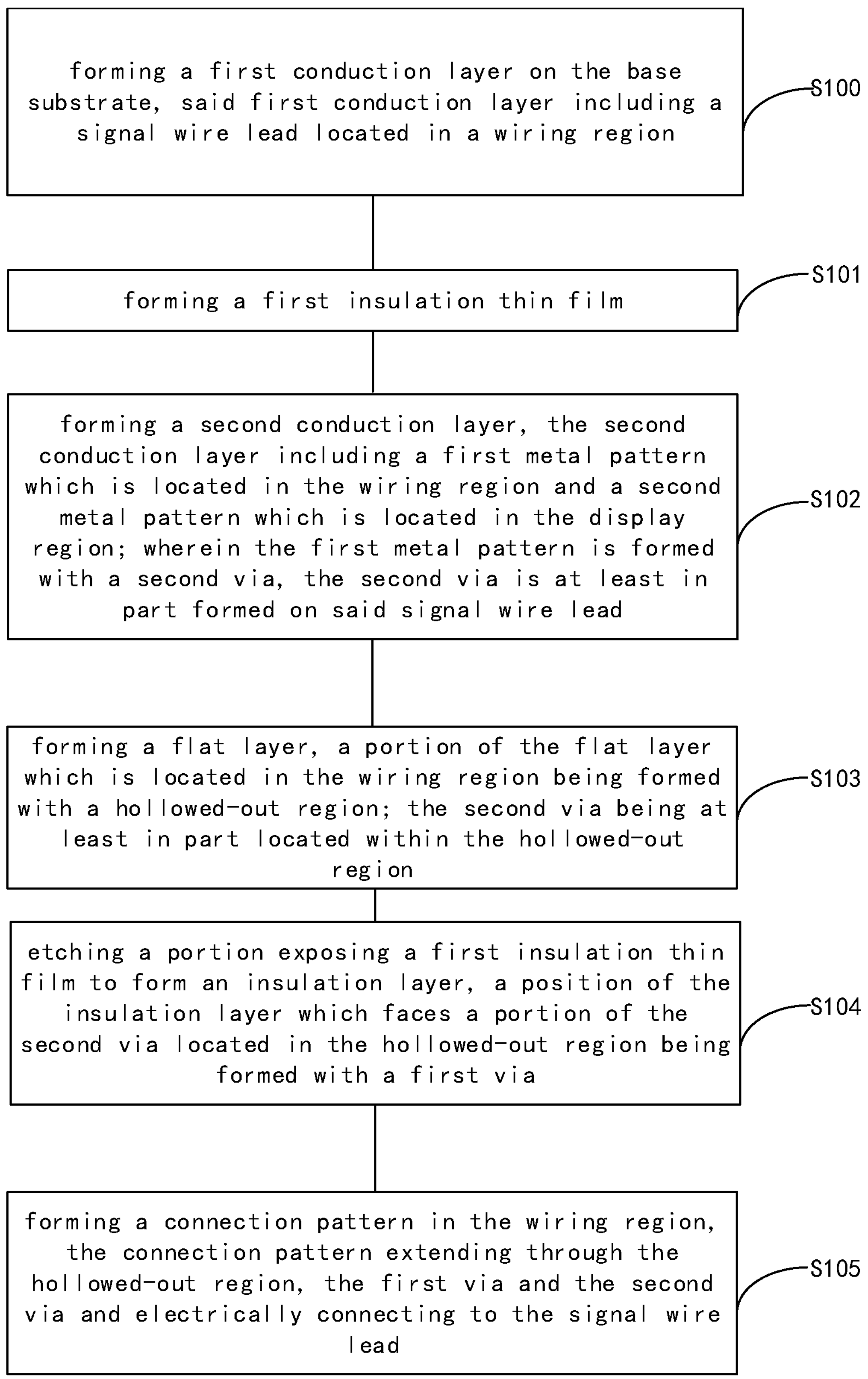
FIG. 7 is a flow diagram of a manufacturing method of a COA display substrate provided according to some embodiments of the present disclosure.
Figure 8:
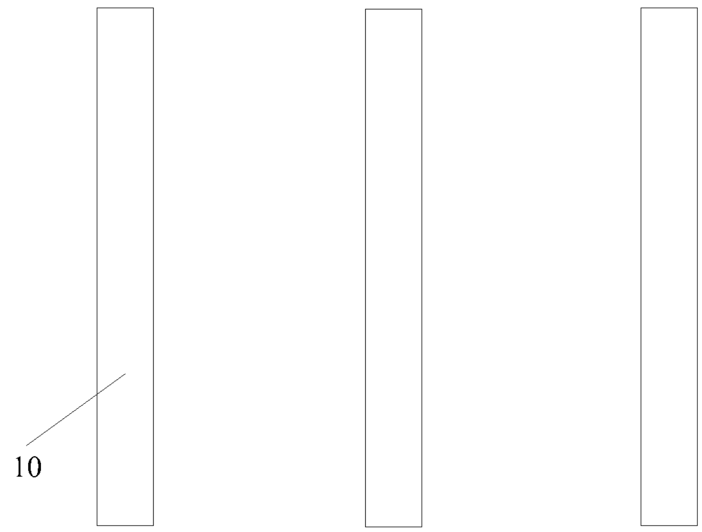
FIG. 8 is a structural diagram of forming a signal wire lead on a base substrate provided according to some embodiments of the present disclosure.

According to some embodiments of the present disclosure, there is also provided a manufacturing method of a COA display substrate. As shown in FIG. 7, the method may include the following steps:

S100: a first conduction layer is formed on a base substrate. As shown in FIG. 8, the first conduction layer includes a signal wire lead 10 located in a wiring region.

In some embodiments, a first conduction film is formed on the base substrate, the first conduction film is patterned to form the first conduction layer.

In some embodiments, the patterning process includes plating a film, coating photoresist, exposing through a mask, developing and etching process, etc.

In some embodiments, the first conduction layer may only include the signal wire lead 10, may also include, in addition to the signal wire lead 10, other patterns, e.g. a signal wire which is located in the display region. In some embodiments, the material of the first conduction layer may be, for example, metal or metal oxide, etc.

Figure 9:
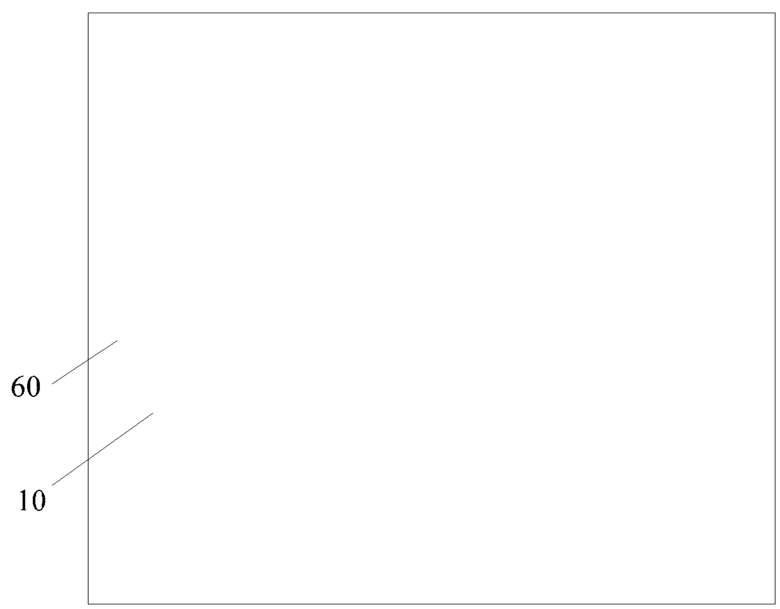
FIG. 9 is a structural diagram of forming a first insulation thin film on a signal wire lead provided according to some embodiments of the present disclosure.

S101: as shown in FIG. 9, a first insulation thin film 60 is formed.

The material of the first insulation thin film 60 is not limited, for example, it may be silicon nitride, silicon oxide or silicon oxynitride, etc.

Figure 10:
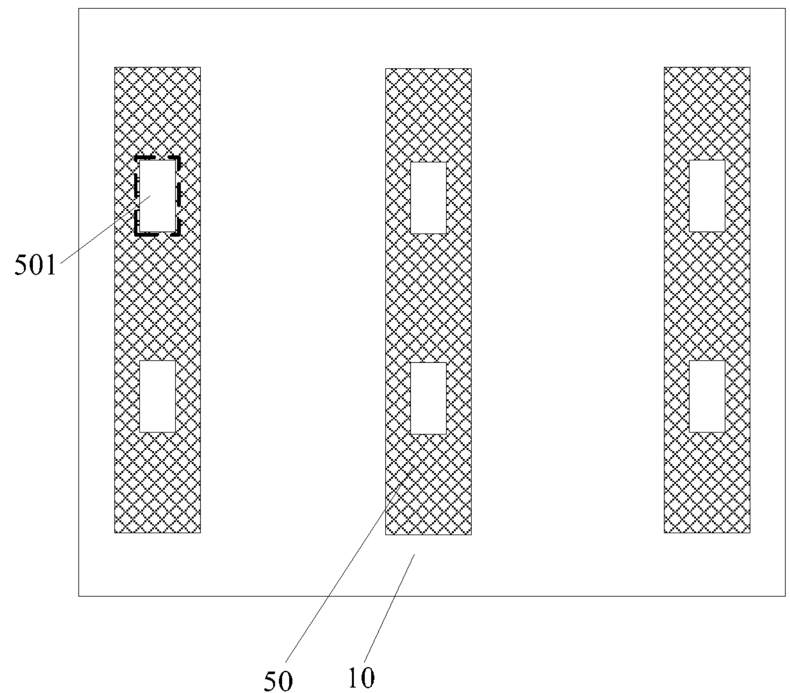
FIG. 10 is a structural diagram of forming a first metal pattern on a first insulation thin film provided according to some embodiments of the present disclosure.

S102: as shown in FIG. 10, a second conduction layer is formed, the second conduction layer includes a first metal pattern 50 which is located in the wiring region 02 and a second metal pattern 60 which is located in the display region 01. a second via 501 is formed in the first metal pattern 50, the second via 501 is at least in part formed on the signal wire lead 10.

In some embodiments, the second metal pattern 60 may be a source-drain or a gate, etc. When the second metal pattern 60 is the source and the drain, before or after the step S102, the above mentioned method further includes forming an active layer (Active) in the display region 01.

Here, since the second via 501 is formed on the signal wire lead 10, those skilled in the art should understand that, the first metal pattern 50 is formed right above the signal wire lead 10, and in the direction perpendicular to the base substrate, the first metal pattern 50 and the first signal wire lead 10 have an overlapping region. In some embodiments, the first metal pattern 50 may completely cover the first signal wire lead 10, may also cover a part of the first signal wire lead 10. The second via 501 may be in part formed on the signal wire lead 10, may also be entirely formed on the signal wire lead 10.

In addition, the first metal pattern 50 may be formed while the second metal pattern 60 is formed. Since the second metal pattern 60 of the display region is a pattern which the COA substrate itself has, it is only necessary to form a pattern corresponding to the first metal pattern 50 in a portion of a mask for forming the second metal pattern 60 which is corresponding to the wiring region 02, and in this way, it is possible to use the mask to form the first metal pattern 50 and the second metal pattern 60 at the same time. Since no additional mask is needed to form the first metal pattern 50, forming the first metal pattern 50 will not result in an increase in the cost.

Figure 11:
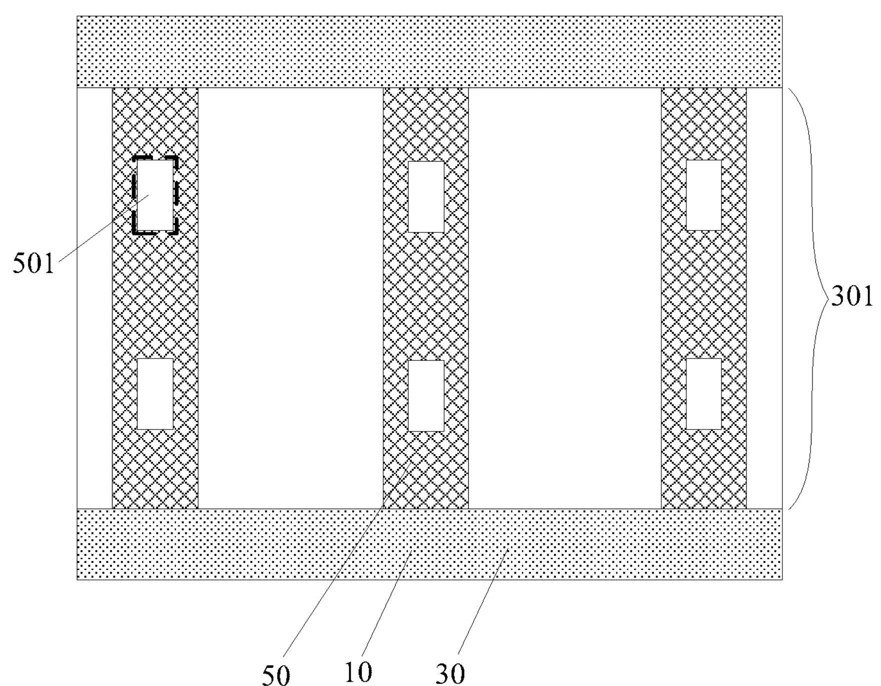
FIG. 11 is a structural diagram of forming a flat layer on a first metal pattern provided according to some embodiments of the present disclosure.

S103: as shown in FIG. 11, a flat layer 30 is formed, wherein a portion of the flat layer 30 which is located in the wiring region 02 is formed with a hollowed-out region 301. The second via 501 is at least in part located within the hollowed-out region 301.

In some embodiments, a flat layer film may be formed first, then the flat layer 30 is formed by a patterning process. The flat layer 30 may be only formed with the hollowed-out region 301, may also be formed with other patterns. Here, the patterning process includes forming a flat layer film, coating photoresist, exposing through a mask, developing, but not be limited thereto.

Figure 12:
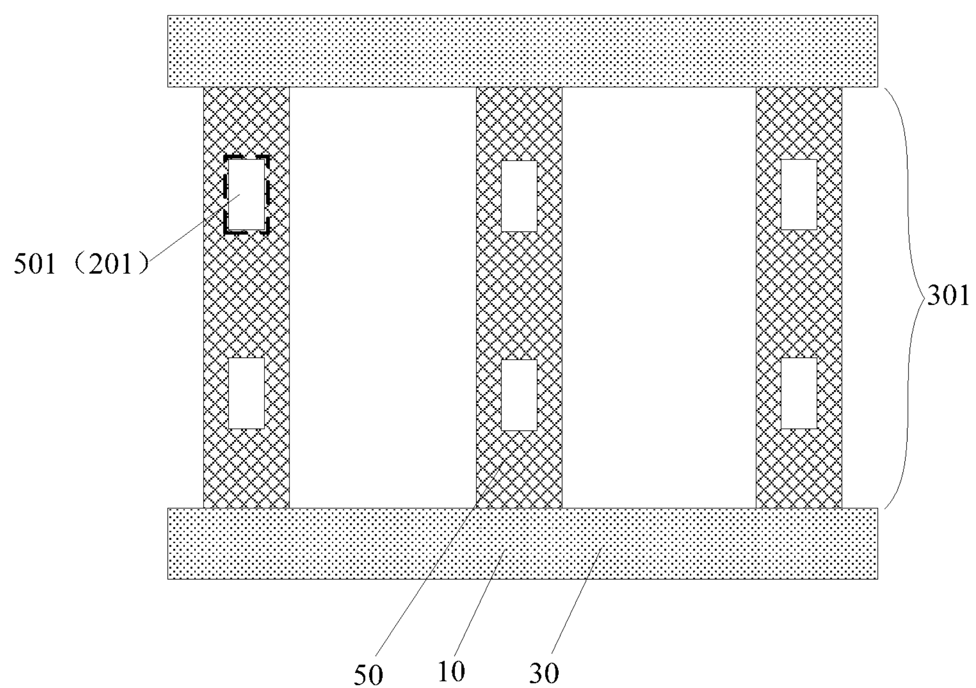
FIG. 12 is a structural diagram of forming an insulation layer provided according to some embodiments of the present disclosure.

The second via 501 is at least in part located within the hollowed-out region 301, and the orthographic projection of the border of the second via 501 on the base substrate may be located within the orthographic projection of the border of the hollowed-out region 301 on the base substrate; the orthographic projection of the second via 501 on the base substrate may also have an overlapping region with the orthographic projection of the flat layer 30 on the base substrate, and have an overlapping region with the orthographic projection of the hollowed-out region 301 on the base substrate S104: as shown in FIG. 12, a portion exposing the first insulation thin film 60 is etched to form an insulation layer 20, wherein a position of the insulation layer 20 which faces a portion of the second via 501 is located in the hollowed-out region 301 being formed with a first via 201.

Since the second conduction layer includes the first metal pattern 50 which is located in the wiring region 02 and the first metal pattern 50 has the second via 501 and the second via 501 is at least in part located within the hollowed-out region 301, when forming the flat layer 30 having the hollowed-out region 301, at this time, a portion of the first insulation thin film 60 which faces the hollowed-out region 301 will expose the first insulation thin film 60. On this basis, a portion of the insulation layer 20 which faces the hollowed-out region 301 of the flat layer 30 and a portion of the first metal pattern 50 which faces the hollowed-out region 301 of the flat layer 30 overlap entirely in the direction perpendicular to the base substrate.

It is to be noted that, when the materials of the flat layer 30 and the first insulation thin film 60 make it impossible to simultaneously pattern the flat layer 30 and the first insulation thin film 60, it is possible to pattern and form the flat layer 30 first, the portion of the flat layer 30 which is located in the wiring region 02 is formed with the hollowed-out region 301, then the portion exposing the first insulation thin film 60 is etched to form the insulation layer 20; when the materials of the flat layer 30 and the first insulation thin film 60 make it possible to simultaneously pattern the flat layer 30 and the first insulation thin film 60, it is possible to simultaneously form the flat layer 30 and the insulation layer 20 through one patterning process.

S105: as shown in FIGS. 4(*b*) and 5(*b*), a connection pattern 40 is formed in the wiring region 02, wherein the connection pattern 40 extends through the hollowed-out region 301, the first via 201 and the second via 501 and electrically connects to the signal wire lead 10.

The material of the connection pattern 40 is not limited, for example, it may be indium tin oxide, indium zinc oxide, indium gallium zinc oxide, etc.

In some embodiments, it is possible to form a conduction film first, then pattern the conduction film to form the connection pattern 40 in the wiring region 02. At this time, it is possible to form only the connection pattern 40, it is also possible to form other patterns.

According to some embodiments of the present disclosure, there is provided a manufacturing method of a COA display substrate, wherein since the second via 501 is formed in the first metal pattern 50 and the second via 501 is at least in part located within the hollowed-out region 301, after the hollowed-out region 301 of the flat layer 30 is formed, it is possible to etch a portion within the hollowed-out region 301 which exposes the insulation thin film without a mask, to form the insulation layer 20 having the first via 201. Thus, the connection pattern 40 may extend though the hollowed-out region 301, the first via 201 and the second via 501 to connect to the signal wire lead 10. In addition, since the first metal pattern 50 of the wiring region 02 and the second metal pattern 60 of the display region are in the same layer, the first metal pattern 50 may be formed while the second metal pattern 60 is formed, thus no additional mask will be added so that the cost will not be increased.

In some embodiments, forming the flat layer includes the following results: in the direction perpendicular to the base substrate, the flat layer 30 and the first metal pattern 50 have an overlapping region; the orthographic projection of the border of the second via 501 on the base substrate is enclosed by the orthographic projection of the border of the hollowed-out region 301 on the base substrate.

In some embodiments, first metal pattern 50 and flat layer 30 have an overlapping region, it is possible that, in the length direction of the signal wire lead 10, one end of the first metal pattern 50 has the overlapping region with the flat layer 30, it is also possible that the two ends of the first metal pattern 50 have the overlapping region with the flat layer 30. Here, in the direction perpendicular to the base substrate, the border of the first metal pattern 50 and the border of the flat layer 30 overlap, namely the first metal pattern 50 and the flat layer 30 have the overlapping region. In some embodiments of the present disclosure, as shown in FIG. 11, both ends of the first metal pattern 50 have overlapping regions with the flat layer 30.

In some embodiments of the present disclosure, since in the direction perpendicular to the base substrate, the first metal pattern 50 and the flat layer 30 have the overlapping region and the orthographic projections of the borders of the second via 501 in the first metal pattern 50 and the first via 201 in the insulation layer 20 on the base substrate are enclosed by the orthographic projection of the border of the hollowed-out region 301 on the base substrate, when the connection pattern 40 formed on the flat layer 30 connects to the signal wire lead 10, since the insulation layer 20 and the first metal pattern 50 are retained at the section position of the flat layer 30, it is possible to reduce the mismatch at the section position of the flat layer 30, prevent the signal wire lead 10 from being etched due to appearance of a gap at the section position.

In some embodiments, forming the flat layer further includes the following results: the orthographic projection of the portion of the signal wire lead 10 corresponding to the hollowed-out region 301 of the flat layer 30 on the base substrate is located within the orthographic projection of the first metal pattern 50 on the base substrate, and two ends of the first metal pattern 50 have the overlapping region with the flat layer 30 in the extension direction of the signal wire lead 10.

In some embodiments of the present disclosure, if the orthographic projection of the first metal pattern 50 on the base substrate and the orthographic projection of the portion of the signal wire lead 10 corresponding to the hollowed-out region 301 on the base substrate overlap in part and/or one end of the first metal pattern 50 extends in the extension direction of the signal wire lead 10 to have the overlapping region with the flat layer 30, the portion of the signal wire lead 10 which does not overlap the first metal pattern 50 may be etched due to the existence of the large mismatch at the section of the flat layer 30. On this basis, the orthographic projection of the first metal pattern 50 on the base substrate covers the orthographic projection of the portion of the signal wire lead 10 corresponding to the hollowed-out region 301 on the base substrate, and the two ends of the first metal pattern 50 extend in the extension direction of the signal wire lead 10 to have the overlapping region with the flat layer 30, so that the whole signal wire lead 10 can be protected.

In some embodiments, after forming the second conduction layer, before forming the flat layer 30, the above mentioned method further includes forming a second insulation thin film and a color film layer which is located in the display region; after forming the flat layer 30, before forming the insulation layer 20, the above mentioned method further includes etching a portion in the hollowed-out region 301 which exposes the second insulation thin film.

The material of the second insulation thin film may be for example silicon nitride, silicon oxide or silicon oxynitride, etc. The materials of the second insulation thin film and the first insulation thin film may be the same, may also be different. In some embodiments, the material of the first insulation thin film 60 is the same as that of the second insulation thin film, thus it is possible to simultaneously etch the first insulation thin film and the second insulation thin film so as to simplify the manufacturing process of the COA substrate.

In some embodiments according to the present disclosure, the color film layer and the array layer are manufactured on the same substrate, such that it is possible to avoid the problem of aligning the color film substrate with the array substrate, reduce the box-alignment difficulty in the process of manufacturing the display panel and avoid the error upon box-alignment. In addition, the black matrix may be designed to be narrower, thereby improving the aperture ratio of a pixel. The above are only some specific embodiments of the present disclosure, but the protection scope of the present invention is not limited thereto. Any changes or substitutions which may be easily conceived of by those skilled in the art within the technical scope disclosed by the present disclosure are to be covered within the protection scope of the present invention. Therefore, the protection scope of the present invention is based on the protection scope of the claims.

What is claimed is:

1. A Color Filter on Array (COA) substrate, including a display region and a wiring region, the COA substrate including the following layers:

a first conduction layer on a base substrate, including a signal wire lead located in the wiring region;

an insulation layer, its portion located in the wiring region having two spaced first vias to expose the signal wire lead;

a second conduction layer, including a first metal pattern which is located in the wiring region and a second metal pattern which is located in the display region, wherein the first metal pattern has two spaced second vias corresponding respectively to said two spaced first vias;

a flat layer, its portion located in the wiring region having a hollowed-out region; and a connection pattern, located in the wiring region, the connection pattern is a continuous structure, wherein each second via is at least in part located within the hollowed-out region, and an orthographic projection of a border of a portion of the second via which is located within the hollowed-out region on the base substrate at least in part overlaps an orthographic projection of a border of a corresponding first via on the base substrate, and the connection pattern extends through the hollowed-out region, each first via and each corresponding second via and connects to the signal wire lead.

2. The COA substrate according to claim 1, wherein a material of the flat layer is the same as that of the insulation layer.

3. The COA substrate according to claim 1, wherein the signal wire lead is a data wire lead or a gate wire lead.

4. The COA substrate according to claim 1, wherein in a direction perpendicular to the base substrate, the first metal pattern and the flat layer have an overlapping region; an orthographic projection of a border of each second via on the base substrate is enclosed by an orthographic projection of a border of the hollowed-out region on the base substrate.

5. The COA substrate according to claim 4, wherein an orthographic projection of the first metal pattern on the base substrate covers an orthographic projection of a portion of the signal wire lead corresponding to the hollowed-out region on the base substrate, and two ends of the first metal pattern extend in an extension direction of the signal wire lead to have an overlapping region with the flat layer.

6. The COA substrate according to claim 1, wherein the COA substrate further comprises a thin-film transistor which is located in the display region; the thin-film transistor comprises a source, a drain, an active layer, a gate as well as a gate insulation pattern;

the second metal pattern is the source and the drain; or, the second metal pattern is the gate.

7. The COA substrate according to claim 6, wherein the insulation layer comprises the gate insulation pattern which is located in the display region.

8. A display device comprising the COA substrate of claim 1.

9. The display device according to claim 8, wherein a material of the flat layer is the same as that of the insulation layer.

10. The display device according to claim 8, wherein the signal wire lead is a data wire lead or a gate wire lead.

11. The display device according to claim 8, wherein in a direction perpendicular to the base substrate, the first metal pattern and the flat layer have an overlapping region; an orthographic projection of a border of each second via on the base substrate is enclosed by an orthographic projection of a border of the hollowed-out region on the base substrate.

12. The display device according to claim 11, wherein an orthographic projection of the first metal pattern on the base substrate covers an orthographic projection of a portion of the signal wire lead corresponding to the hollowed-out region on the base substrate, and two ends of the first metal pattern extend in an extension direction of the signal wire lead to have an overlapping region with the flat layer.

13. The display device according to claim 8, wherein the COA substrate further comprises a thin-film transistor which is located in the display region; the thin-film transistor comprises a source, a drain, an active layer, a gate as well as a gate insulation pattern;

the second metal pattern is the source and the drain; or, the second metal pattern is the gate.

14. The COA substrate according to claim 13, wherein the insulation layer comprises the gate insulation pattern which is located in the display region.

15. A manufacturing method of a COA display substrate, comprising:

forming a first conduction layer on a base substrate, the first conduction layer including a signal wire lead located in a wiring region;

forming a first insulation thin film;

forming a second conduction layer, the second conduction layer including a first metal pattern which is located in the wiring region and a second metal pattern which is located in a display region; wherein the first metal pattern is formed with two spaced second vias, each second via is at least in part formed on the signal wire lead;

forming a flat layer, a portion of the flat layer which is located in the wiring region being formed with a hollowed-out region; each second via being at least in part located within the hollowed-out region;

etching an exposed portion of the first insulation thin film to form an insulation layer, a position of the insulation layer which faces portions of the two spaced second vias located in the hollowed-out region being formed correspondingly with two spaced first vias;

forming a connection pattern in the wiring region, the connection pattern extending through the hollowed-out region, each first via and each corresponding second via and electrically connecting to the signal wire lead, the connection pattern is a continuous structure.

16. The manufacturing method according to claim 15, wherein after forming the second conduction layer, before forming the flat layer, the manufacturing method further comprises forming a second insulation thin film and a color film layer which is located in the display region;

after forming the flat layer, before forming the insulation layer, the manufacturing method further comprises etching an exposed portion of the second insulation thin film in the hollowed-out region.

17. The manufacturing method according to claim 15, wherein forming the flat layer comprises:

in a direction perpendicular to the base substrate, the flat layer and the first metal pattern have an overlapping region; an orthographic projection of a border of each second via on the base substrate is enclosed by an orthographic projection of a border of the hollowed-out region on the base substrate.

18. The manufacturing method according to claim 17, wherein forming the flat layer further comprises:

a projection of a portion of the signal wire lead corresponding to the hollowed-out region of the flat layer on the base substrate is located within a projection of the first metal pattern on the base substrate, and two ends of the first metal pattern have an overlapping region with the flat layer in an extension direction of the signal wire lead.

* * * * *